United States Patent [19]

Majerus

[11] Patent Number: 4,980,111
[45] Date of Patent: Dec. 25, 1990

[54] INJECTION MOLDING METHOD AND APPARATUS USING A UNIVERSAL COLD RUNNER BLOCK

[75] Inventor: Norbert Majerus, Akron, Ohio

[73] Assignee: The Goodyear Tire & Rubber Company, Akron, Ohio

[21] Appl. No.: 258,385

[22] Filed: Oct. 17, 1988

[51] Int. Cl.$^5$ .............................................. B29C 45/10
[52] U.S. Cl. ............................... 264/219; 264/297.2; 264/328.8; 425/190; 425/562; 425/572; 425/573; 425/588
[58] Field of Search ................... 264/219, 297.2, 297.3, 264/328.1, 328.3, 328.8, 328.11, 328.14; 425/182, 183, 185, 190, 192 R, 195, 542, 543, 547, 549, 562, 564, 566, 567–573, 588

[56] References Cited

U.S. PATENT DOCUMENTS

| | | |
|---|---|---|
| 3,231,938 | 2/1966 | Seymour . |
| 3,807,921 | 4/1974 | Murgatroyd ..................... 425/588 |
| 4,052,496 | 10/1977 | Goodfellow ..................... 264/251 |
| 4,059,375 | 11/1977 | Koch et al. ..................... 425/589 |
| 4,249,882 | 2/1981 | Koch et al. ..................... 425/547 |
| 4,340,156 | 7/1982 | Müller ............................. 425/549 |
| 4,416,604 | 11/1983 | Bender et al. .................. 425/183 |
| 4,500,279 | 2/1985 | Devellian et al. .............. 425/548 |
| 4,592,711 | 6/1986 | Capy .............................. 425/562 |
| 4,826,416 | 5/1989 | Majerus et al. ................ 264/328.8 |

Primary Examiner—Jill L. Heitbrink
Attorney, Agent, or Firm—Frederick K. Lacher; T. P. Lewandowski

[57] ABSTRACT

A cold runner block (38) has spaced drop holes (54) arranged in a selected pattern for supplying fluid molding material to nozzles (60) connected to the mold gates (62). The drop holes (54) open on nozzle runners (52) in the cold runner block (38) which are in communication with a source of fluid molding material. Close-off rods (68) are selectively positioned in the runners (52) to block the flow of fluid molding material beyond the drop holes (54) communicating with a mold (12) for an object of a particular size and shape. Drop hole plugs (66) are provided for the drop holes (54) which open on the nozzle runners (52) in the section of the runners (52) not blocked by the close-off rods (68).

12 Claims, 5 Drawing Sheets

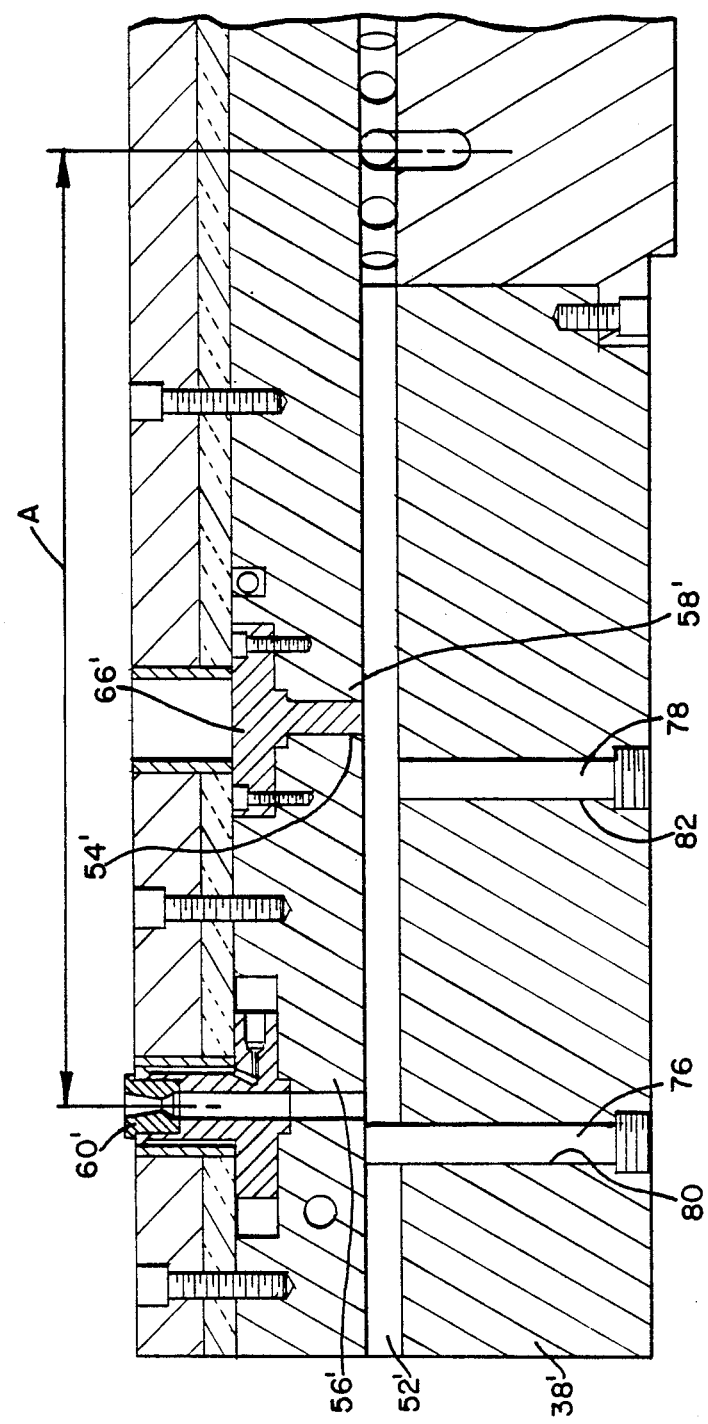

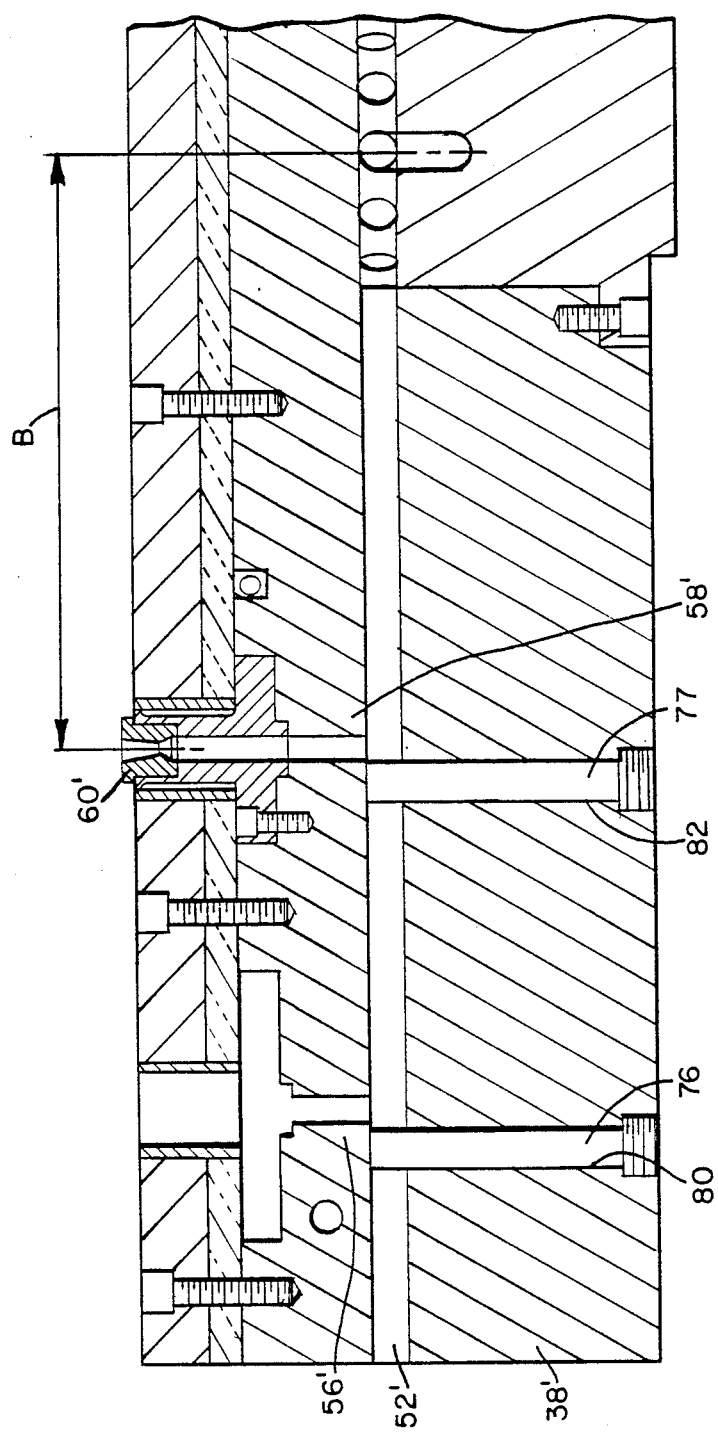

INJECTION MOLDING METHOD AND APPARATUS USING A UNIVERSAL COLD RUNNER BLOCK

This invention relates to injection molding objects having different sizes and shapes such as ring members and especially tire treads where it is desirable to use the same cold runner block for different diameter treads. Heretofore it has been necessary to use a different cold runner block for tread molds of different diameters. This has increased the cost of molding the treads and also required storage space for storing the cold runner blocks.

The present invention provides a universal cold runner block having drop holes at different diameters opening on nozzle runners for supplying the fluid molding material which are connected to the gates of the mold. Close-off rods are provided to block the nozzle runners at positions adjacent the drop holes for the particular size tread mold. Close-off plugs are provided for closing drop holes for other diameter treads which open on the sections of the runners not closed off by the close-off rods.

In accordance with an aspect of this invention there is provided an injection mold universal cold runner block for injection molding objects having different shapes or sizes comprising:

(a) a plate member;
(b) fluid passages in the plate member for the circulation of temperature moderating fluids;
(c) a manifold in the plate member for receiving and distributing fluid molding material;
(d) a supply runner extending from the manifold to a location outside the plate member for communication with a source of the fluid molding material;
(e) a plurality of spaced drop holes in the plate member arranged for communication with nozzles disposed between the plate member and the molds for the objects of different shapes or sizes;
(f) nozzle runners in the plate member extending from the manifold to positions adjacent the drop holes to communicate the fluid molding material to the nozzles; and
(g) close-off means adjacent the nozzle runners to direct the fluid molding material into the drop holes in communication with the nozzles for one of the objects.

In accordance with another aspect of this invention there is provided an apparatus for injection molding tire treads of different diameters comprising a generally cylindrical mold having a mold cavity for a tire tread of a predetermined diameter, a plurality of inlet gates in the mold in connection with the mold cavity, a cold runner block member connected to the mold, a central manifold at a central portion of the block for receiving and distributing a fluid molding material, a supply runner extending from the manifold to an edge of the cold runner block for communication with a source of the fluid molding material, a plurality of circumferentially spaced drop holes in the cold runner block member arranged in generally circular portions about the manifold at different diameters for communication with nozzles mounted between the block member and the mold, the drop holes being positioned in the generally circular portions so that at least some of the drop holes in one of the circular portions are in alignment with some of the drop holes in another of the circular portions, nozzle runners in the block member extending from the manifold to a radially outside edge of the cold runner block, each of the nozzle runners extending to positions adjacent the drop holes to communicate the fluid molding material to the nozzles, and close-off means adjacent the drop holes at one of the circular portions to block the nozzle runners and direct the fluid molding material into the drop holes and through the nozzles to the inlet gates of the mold, the nozzles and the cold runner block being cooled whereby the fluid molding material remaining in the nozzles and in the cold runner block is prevented from curing so that the cured fluid molding material remaining in the mold is removable after curing of the tire tread.

In accordance with a further aspect of this invention there is provided a method of injection molding objects of different shapes and sizes with a universal cold runner block having fluid passages in the cold runner block for the circulation of temperature moderating fluid, a manifold in the cold runner block, a supply runner extending from the manifold to a location outside the cold runner block, a plurality of spaced drop holes in the cold runner block arranged for communication with nozzles disposed between the cold runner block and molds for the objects of different shapes and sizes, nozzle runners in the cold runner block extending from the manifold to positions adjacent the drop holes comprising:

(a) mounting a mold for one of the objects of different shapes or sizes on the universal cold runner block with at least some of the nozzles being in communication with gates of the mold;
(b) circulating temperature moderating fluid through the fluid passages in the cold runner block;
(c) blocking the nozzle runners with closeoff means at positions adjacent the drop holes in communication with the nozzles in communication with the gates of the mold;
(d) communicating the fluid molding material through the supply runner to the manifold;
(e) communicating the fluid molding material from the manifold through the nozzle runners to the drop holes and the nozzles in communication with the gates of the mold for filling a mold cavity of the mold;
(f) heating the mold to cure the fluid molding material while cooling the fluid molding material in the nozzles and drop holes in communication with the gates of the mold; and
(g) opening of the mold and removing the one of the objects of different shapes and sizes.

To acquaint persons skilled in the arts most closely related to the present invention, certain preferred embodiments thereof illustrating best modes now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
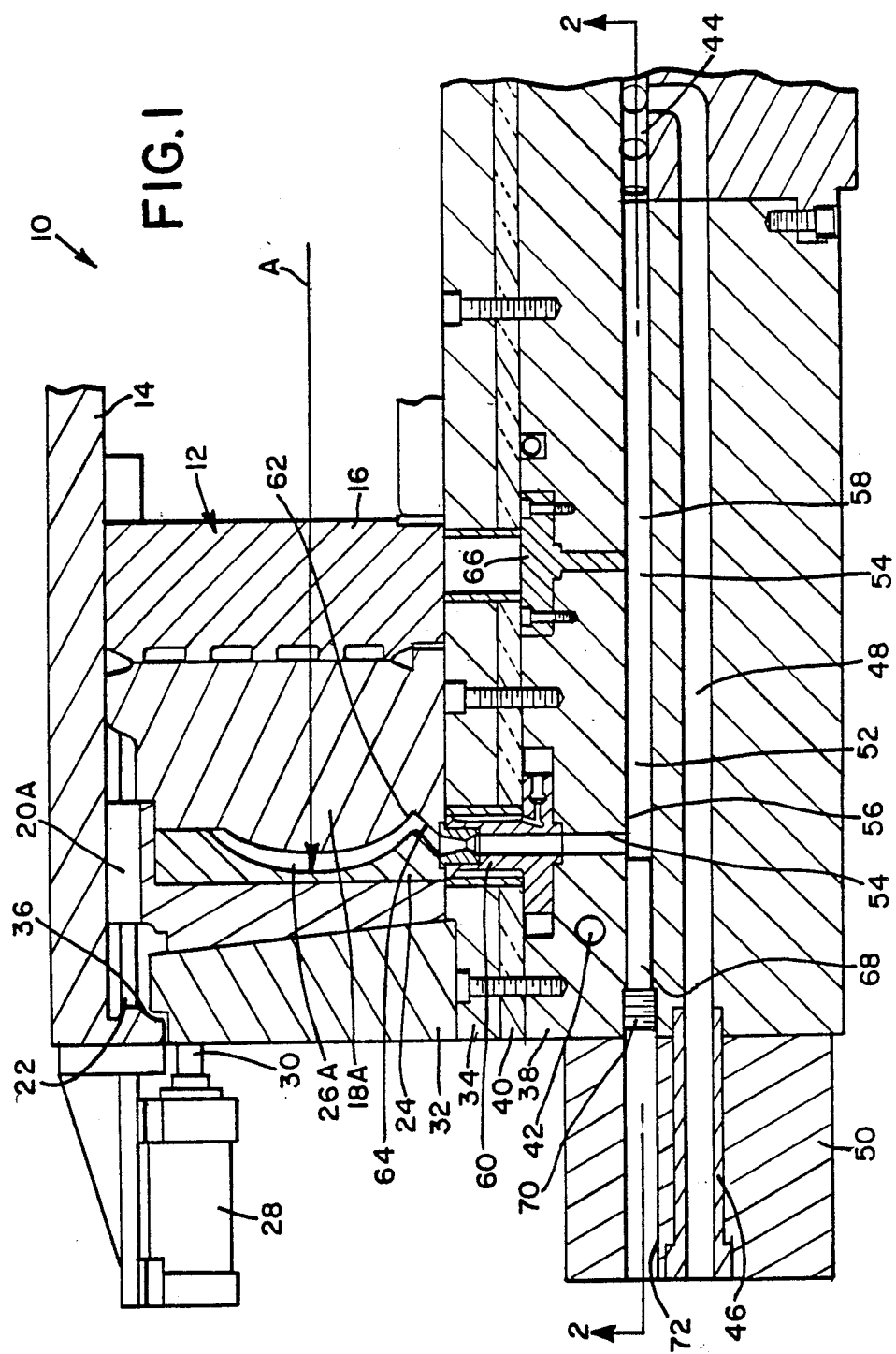
FIG. 1 is a fragmentary sectional view of one half of a segmental mold mounted in a tire press showing the cold runner block embodying the invention with one of the nozzles positioned for injection of a tread of one diameter.

FIG. 4 is a sectional view like FIG. 1 of the cold runner block showing a modification of the invention with vertically disposed intersecting close-off rods for blocking the nozzle runners spaced from the supply runner and with one of the rods at a position adjacent one of the drop holes at a radially inner, generally circular, portion of the cold runner block. In this modification the supply runner is spaced circumferentially from the nozzle runner and is therefore not shown in this sectional view.

FIG. 5 is a sectional view like FIG. 4 showing one of the vertically disposed close-off rods blocking the nozzle runner at a position adjacent one of the drop holes in a radially outer circular portion of the cold runner block and showing a close-off plug inserted in a drop hole in the section of the nozzle runner not blocked by the close-off rod.

Figure 2:
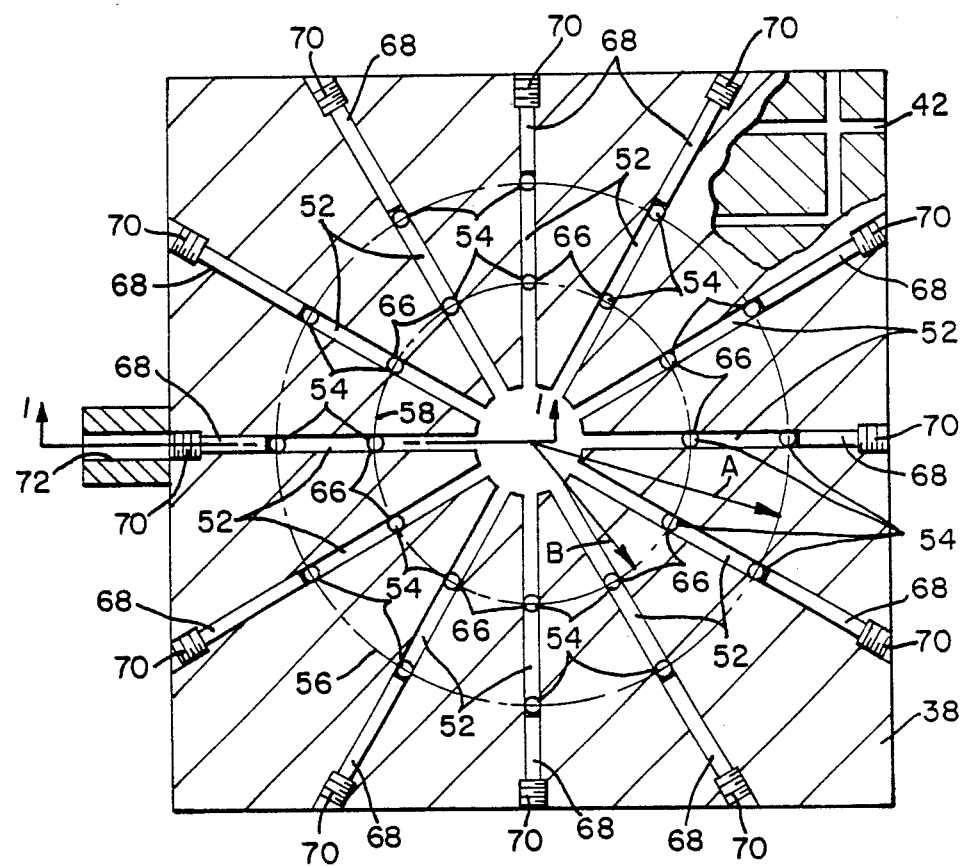
FIG. 2 is a sectional view of the cold runner block taken along line 2—2 in FIG. 1 with parts being broken away to show the passages for the temperature moderating fluid.
Figure 3:
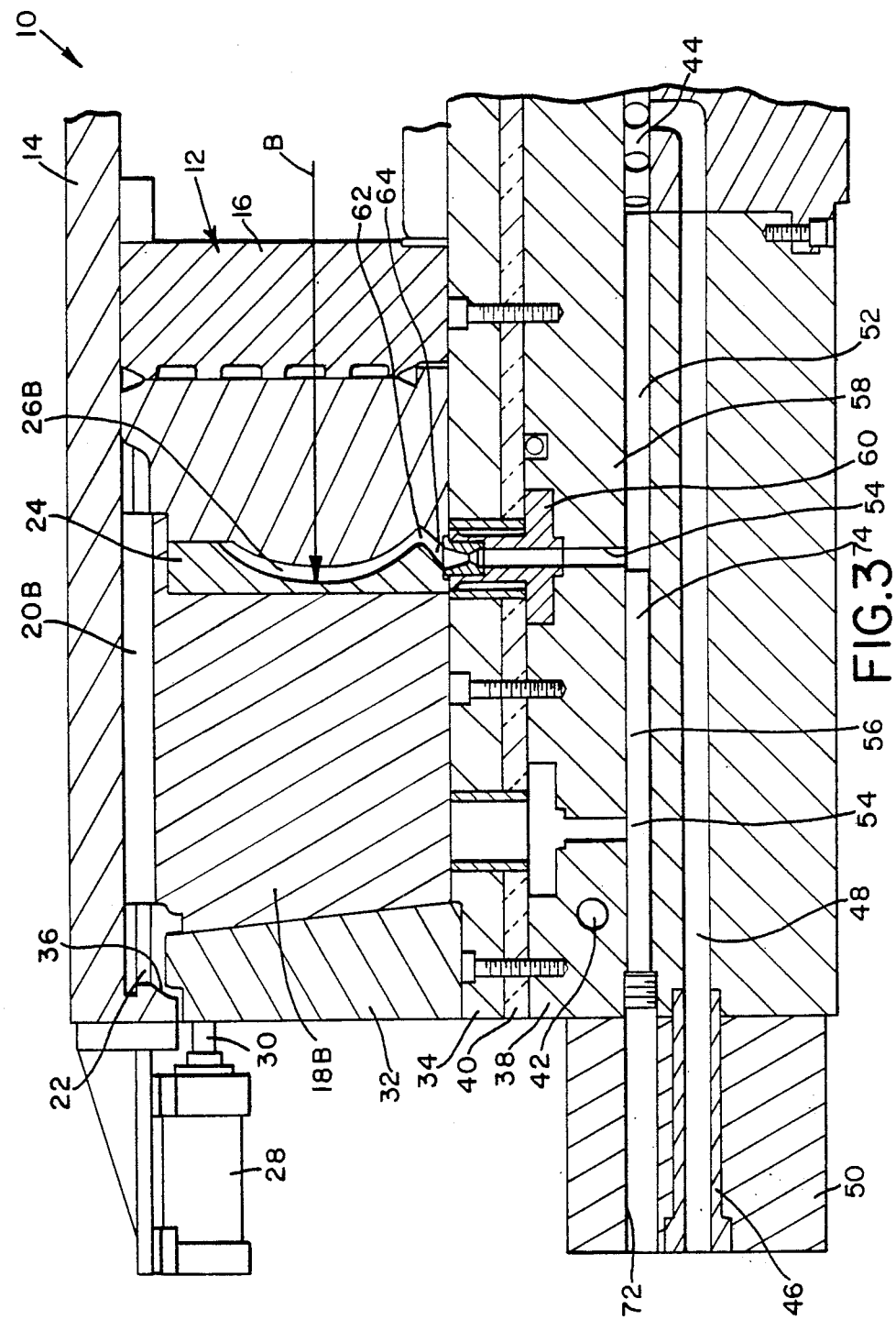
FIG. 3 is a view like FIG. 1 showing one of the nozzles positioned for injection of a tread of another diameter with a close-off plug inserted in one of the drop holes in the section of the nozzle runner not blocked by the close-off rod.

Referring to FIGS. 1, 2 and 3, part of an apparatus 10 for injection molding ring members such as tire treads is shown. A generally cylindrical mold 12 is fastened to a top end plate 14 of the apparatus 10 which, in this case, is a tire press. A core 16 is mounted on the top end plate 14. Mold segments 18a and 18b, shown in FIGS. 1 and 3, respectively, have slide blocks 20a and 20b slidably mounted on slide rods 22 for radial movement of the segments. In the embodiment shown, eight mold segments 20a, 20b provide a continuous segmental outer tread insert 24 which defines mold cavities 26a and 26b with the surface of the core 16.

Segmental mold actuating cylinders 28 are supported on brackets mounted to the top end plate 14 and connected to the mold segments 18a and 18b by piston rods 30. The mold actuating cylinders 28 may be in communication with a source of fluid pressure and suitable controls for radially contracting and expanding the mold segments 20a and 20b, as desired. A container ring 32 is mounted on a bottom hot plate 34 and has a tapered inner surface for engagement with tapered surfaces of the mold segments 18a, 18b. The upper edge of the container ring 32 may have slots for the piston rods 30 and extends within a tapered register 36 of the top end plate 14 providing a register for seating the container ring and holding it in position during the molding process.

The bottom hot plate 34 is supported on a cold runner block 38 insulated from the bottom hot plate 34 by suitable insulation 40. The cold runner block 38 may be supported on a vertically movable plate of the press (not shown).

The cold runner block 38 is a generally flat plate member having fluid passages 42 in communication with a suitable source of temperature moderating fluid such as water. A central manifold 44 is provided at a central portion of the cold runner block 38 and is connected to a conduit 46 at an edge of the cold runner block by a supply runner 48 extending from the manifold to the conduit. The conduit 46 may be mounted in a connecting block 50 fastened to the edge of the cold runner block 38 and positioned for engagement with a source of fluid molding material such as an injection molding machine (not shown).

Nozzle runners 52 in the cold runner block 38 extend from the central manifold 44 to at least one edge of the cold runner block and are in communication with drop holes 54 circumferentially spaced in the cold runner block in generally circular portions 56 and 58 having different diameters. Cooled nozzles 60 are attached to the cold runner block 38 and are in communication with the drop holes 54. The cooled nozzles 60 are also connected to circumferentially spaced gates 62 along at least one side of the mold cavity 26a and 26b by tapered sprues 64. The fluid molding material remaining in the cooled nozzles 60 and in the nozzle runners 52 and supply runner 48 is prevented from curing. The cured fluid molding material in the gates 62 and sprues 64 is removable after curing of the treads in the mold cavities 26 and 26b.

Referring to FIGS. 1 and 2, the mold cavity 26a is for molding a tread ring having a diameter A which corresponds with the drop holes 54 in the circular portion 56. Close-off means for directing the fluid molding material from the manifold 44 to the drop holes 54 include plug members 66 and close-off rods 68. In the embodiment shown in FIG. 1 and 2, the plug members 66 are mounted on the cold runner block 38 and close the drop holes 54 in the circular portion 58 between the manifold 44 and the drop holes 54 in the circular portion 56. The close-off rods 68 have substantially the same diameter as the nozzle runners 52 and are slidable into the nozzle runners to a position adjacent the drop holes 54 in the circular portion 56. The close-off rods 68 may have threaded portions 70 for threaded engagement with threads in the nozzle runners 52 to hold the rods in position. An opening 72 may be provided in the connecting block 50 through which one of the close-off rods 68 is inserted into one of the nozzle runners 52 which leads to the connecting block.

When it is desired to injection mold tread rings of a smaller diameter B into the mold cavity 26b, as shown in FIG. 3, longer close-off rods 74 are slidably inserted in the nozzle runners 52 and are of a length to block the nozzle runners at positions adjacent the drop holes 54 in the circular portion 58. The plug members 66 are removed and the cooled nozzles 60 mounted for communicating the fluid molding material through the sprues 64 to the gates 62 of the mold cavity 26b. The mold segments 18b are also substituted for the mold segments 18a.

In operation of the apparatus 10, shown in FIGS. 1, 2 and 3, the segmental molds 12 are closed by closing the tire press and applying a clamping pressure which is preferably from 600 to 1000 tons (609.62 to 1016 metric tons). Heating of the segmental molds 12 may be provided by heating passages (not shown) in communication with a suitable heating means such as steam. The molds 12 are heated to a relatively high temperature in the range from 300° F. to 400° F. (149° C. to 204° C.) and preferably to around 340° F. (171° C.). The curing time of the ring treads in the mold cavities 26a and 26b may be from one and one-half to eight minutes, depending upon the curing properties of the injected rubber, the temperature of the segmental molds 12 and the thickness of the ring treads which may be in the range of from 12/32 to one inch (0.95 to 2.54 cm).

Vacuum passages (not shown) may be provided in the segmental mold 12 in communication with the mold cavities 26a and 26b. Also a bumping cycle may be used if required. The cold runner block 38 is cooled by circulating a suitable cooling medium through the fluid passages 42 and around the nozzles 60. For example, water, which may be in the range of 160° F. to 260° F. (71° C. to 127° C.), and preferably around 220° F. (104° C.) at 80 psi (5.62 kg/cm$^2$) may be used. The temperature of the cold runner block 38 is maintained between 200° F. and 280° F. (93° C. to 138° C.) for optimum results. After injection and curing of the treads in the mold cavities 26a and 26b, the press is opened by separating the cold runner block 38 from the top end plate 14 whereupon the container ring 32 is moved away from the mold segments 18a and 18b so that the segments and the outer tread insert 24 may be pulled away from the core 16 by retracting the piston rods 30 into the mold actuating cylinders 28. The tread can then be removed in a manner well known to those skilled art.

Referring to FIGS. 4 and 5, a modification of the cold runner block 38' is shown in which all of the parts are identical with the parts of the cold runner block shown in FIGS. 1, 2 and 3 except close-off rods 76, 77 and 78 are used instead of the close-off rods 68 and 74. Also the supply runner 48 is not in the same plane as any of the nozzle runners 52'. In describing the construction of the modification shown in FIGS. 4 and 5, those parts, which are identical with the parts of the cold runner block 38 shown in FIGS. 1, 2 and 3, will be identified with the same number and a prime mark. As shown in FIG. 4, the drop holes 54' in communication with the nozzles 60' for molding a tread with a diameter A open on the nozzle runner 52'. Adjacent the drop holes 54' are elongated holes 80 in the cold runner block 38' intersecting the nozzle runners 52'. The close-off rods 76 are slidably inserted in the elongated holes 80 and project into the nozzle runners 52' at positions adjacent the drop holes 54' in the circular portion 56'. Plug member 66' are mounted on the cold runner block 38' to block the drop holes 54' and prevent movement of the fluid molding material through the drop holes. Second elongated holes 82 are provided in the cold runner block 38' at positions adjacent the drop hole 54' in the circular portion 58' and in this case the holes are filled with the close-off rods 78 which have a length terminating at the side of the nozzle passage 52' so that the fluid molding material can flow by the plug members 66' and the close-off rods 78 for communication with the nozzles 60'.

Referring to FIG. 5, the cold runner block 38' has the nozzles 60' located in the circular portion 58' for communication with the mold cavity 26b for molding tread rings having diameter B. Close-off rods 77 having a length the same as the close-off rods 76 are slidably inserted in the elongated holes 82 to block the nozzle runners 52'. The operation of the apparatus 10 with the cold runner block 38' shown in FIGS. 4 and 5 is substantially the same as the operation described hereinabove for the cold runner block shown in FIGS. 1, 2 and 3.

It can be seen that the drop holes 54 and 54', which are located in the circular portions 56, 56', 58 and 58' may be located in other circular portions having lesser or greater diameters. Also, additional drop holes 54 and 54' may be added in circular portions having other diameters in a manner such as that described for the embodiments shown in the drawings. Although the invention has been applied to circular objects such as tire molds, it is applicable to universal cold runner blocks for molding other objects. This can be accomplished by arranging the drop holes in a selected pattern in communication with nozzle runners positioned for communication with a manifold and the drop holes.

While certain representative embodiments and details have been shown for the purpose of illustrating the invention, it will be apparent to those skilled in the art that various changes and modifications may be made therein without departing from the spirit or scope of the invention.

What is claimed is:

1. A method of injection molding objects of different shapes and sizes with a universal cold runner block having fluid passages in said cold runner block for the circulation of temperature moderating fluid, a manifold in said cold runner block, a supply runner extending from said manifold to a location outside said cold runner block, a plurality of spaced drop holes in said cold runner block arranged for communication with nozzles disposed between said cold runner block and gates of different size molds for said objects of different shapes and sizes, nozzle runners in said cold runner block extending from said manifold to positions adjacent said drop holes comprising:
    (a) mounting one of said different size molds for one of said objects of different shapes or sizes on said universal cold runner block with at least some of said nozzles being in communication with said gates of said mold;
    (b) circulating temperature moderating fluid through said fluid passages in said cold runner block;
    (c) blocking said nozzle runners with close-off rods at positions adjacent said drop holes in communication with said nozzles in communication with said gates of said mold and closing off said drop holes not in communication with said nozzles and said gates;
    (d) communicating said fluid material through said supply runner to said manifold;
    (e) communicating said fluid molding material from said manifold through said nozzle runners to said drop holes and said nozzles in communication with said gates of said mold for filling a mold cavity of said mold;
    (f) heating said mold to cure said fluid molding material while cooling said fluid molding material in said nozzles and drop holes in communication with said gates of said mold; and
    (g) opening said mold and removing said one of said objects of different shapes and sizes.

2. The method of claim 1 including the step of blocking said nozzle runners by inserting close-off rods in said nozzle runners to positions adjacent said drop holes and said nozzles in communication with said gates of said mold.

3. An injection mold universal cold runner block for injection molding objects having different shapes or sizes with different size molds comprising:
    (a) a plate member;
    (b) fluid passages in said plate member for the circulation of temperature moderating fluids;
    (c) a manifold in said plate member for receiving and distributing fluid molding material;
    (d) a supply runner extending from said manifold to a location outside said plate member for communication with a source of said fluid molding material;
    (e) a plurality of spaced drop holes in said plate member arranged for communication with nozzles for said molds disposed between said plate member and one of said different size molds for said objects of different shapes or sizes;

(f) nozzle runners in said plate member extending from said manifold to at least one edge of said plate member and to positions adjacent said drop holes to communicate said fluid molding material to said nozzles;

(g) close-off rods for selectively closing off portions of said nozzle runners; and (h) at least one of said close-off rods being fastened to said plate member in a position adjacent one of said drop holes in communication with one of said nozzles for one of said molds to direct said fluid molding material into said one of said molds through said one of said nozzles.

4. An injection mold universal cold runner block according to claim 3 including plug members for insertion in said drop holes opening on said nozzle runners and not in communication with said nozzles for said one of said molds for said objects.

5. An injection mold universal cold runner block according to claim 3 wherein said one of said close-off rods is of substantially the same diameter as said nozzle runner and is slidable into said nozzle runners from an edge of said plate member to said position adjacent one of said drop holes and is fastened to said plate member by threaded engagement with threads in said nozzle runner.

6. An injection mold universal cold runner block according to claim 3 wherein said one of said close-off rods is slidably mounted in an elongated hole in said plate member intersecting and blocking said nozzle runner at said position adjacent one of said drop holes and adjacent one of said drop holes and is fastened to said plate member by threaded engagement with threads in said elongated hole.

7. An injection mold universal cold runner block according to claim 3 wherein said objects are ring members of different diameters, said manifold is at a central portion of said plate member, said supply runner extends from an edge of said plate member to said manifold, said drop holes are arranged in generally circular portions about said manifold at said different diameters, said drop holes are positioned in said generally circular portions so that at least some of said drop holes in said circular portions are in alignment with some of said drop holes in another of said circular portions, said nozzle runner in said plate member extend from said manifold to at least one edge of said plate member, and said close-off rods are positioned adjacent said drop holes at one of said circular portions to direct said fluid molding material into said drop holes in communication with said nozzles for one of said ring members of a desired diameter.

8. An injection mold universal cold runner block according to claim 7 including plug members for insertion in said drop holes opening on said nozzle runners at said circular portions between said manifold and said drop holes adjacent said close-off rods.

9. Apparatus for injection molding tire treads of different diameters comprising a generally cylindrical mold having a mold cavity for a tire tread of a predetermined diameter, a plurality of inlet gates in said mold in connection with said mold cavity, a cold runner block member connected to said mold, a central manifold at a central portion of said block member for receiving and distributing a fluid molding material, a supply runner extending from said manifold to an edge of said cold runner block member for communication with a source of said fluid molding material, a plurality of circumferentially spaced drop holes in said cold runner block member arranged in generally circular portions about said manifold at different diameters for communication with nozzles mounted between said block member and said mold, said drop holes being positioned in said generally circular portions so that at least some of said drop holes in one of said circular portions are in alignment with some of said drop holes in another of said circular portions, nozzle runners in said block member extending from said manifold to a radially outside edge of said cold runner block, each of said nozzle runners extending to positions adjacent said drop holes to communicate said fluid molding material to said nozzles, and close-off rods fastened to said cold runner block member in positions adjacent said drop holes at one of said circular portions to block said nozzle runners and direct said fluid molding material into said drop holes and through said nozzles to said inlet gates of said mold, and said nozzles and said cold runner block being cooled whereby said fluid molding material remaining in said nozzles and in said cold runner block is prevented from curing so that said cured fluid molding material remaining in said mold is removable after curing of said tire tread.

10. Apparatus in accordance with claim 9 wherein said close-off rods are of substantially the same diameter as said nozzle runners and are slidable into said nozzle runners from an edge of said block member to said positions adjacent said drop holes and means to fasten said close-off rods to said cold runner block in said positions including threaded engagement with threads in said nozzle runners.

11. Apparatus in accordance with claim 9 wherein said close-off rods are slidably mounted in elongated holes in said cold runner block member intersecting said nozzle runners at said positions adjacent said drop holes for blocking said nozzle runners and means to fasten said close-off rods to said cold runner block in said positions.

12. Apparatus in accordance with claim 9 including plug members for insertion in said drop holes opening on said nozzle runners at said circular portions between said manifold and said drop holes adjacent said close-off rods.

* * * * *